United States Patent [19]
Baker et al.

[11] Patent Number: 5,365,581
[45] Date of Patent: Nov. 15, 1994

[54] TELEPHONIC SWITCHING SYSTEM WITH AUTOMATIC PORT ASSIGNMENT CAPABILITY AND METHOD

[75] Inventors: Daniel F. Baker, Rolling Meadows; Joseph C. Steinlicht, Glen Ellyn, both of Ill.

[73] Assignee: Rockwell International Corporation, Seal Beach, Calif.

[21] Appl. No.: 904,413

[22] Filed: Jun. 25, 1992

[51] Int. Cl.⁵ ............................................. H04M 3/42
[52] U.S. Cl. ................... 379/196; 379/201; 379/142
[58] Field of Search ............... 379/196, 197, 198, 200, 379/243, 201, 95, 142

[56] References Cited

U.S. PATENT DOCUMENTS

| | | | |
|---|---|---|---|
| 4,899,373 | 2/1990 | Lee | 379/207 |
| 4,928,306 | 5/1990 | Biswas | 379/201 |
| 4,959,854 | 9/1990 | Cave | 379/157 |
| 5,012,511 | 4/1991 | Hanle | 379/211 |
| 5,054,059 | 10/1991 | Stern | 379/200 |
| 5,193,110 | 3/1993 | Jones | 379/94 |
| 5,267,300 | 11/1993 | Kao | 379/94 X |

*Primary Examiner*—James L. Dwyer
*Assistant Examiner*—Michael N. Lau
*Attorney, Agent, or Firm*—C. B. Patti; H. F. Hamann

[57] ABSTRACT

An automatic port capability assignment system for assigning port capabilities to communication ports (20) of a telephonic switching system (10) with a switch (12) controlled by a central processing unit (14) having a memory (15) to interconnect an external network (16) of external telephonic units with interior telephonic units (18) respectively connected with communication ports (20) of the switch (12) and having various communications capabilities. The physical capabilities of an interior telephonic unit (18) connected to a port (20) are determined by a system administration unit (13) assigning a logical device type and a predetermined set of personal capabilities for the individual user. In response to receipt of a sign-in code of an individual user on an interior telephonic unit (18), the automatic port capability assignment system ascertains the personal capabilities permitted for the individual user. Port capabilities are assigned by the control processing unit (14) to communication ports (20) based on the ascertained personal capabilities and the determined physical capabilities of the interior communication unit (20) connected to the port (20).

33 Claims, 8 Drawing Sheets

TELEPHONIC SWITCHING SYSTEM WITH AUTOMATIC PORT ASSIGNMENT CAPABILITY AND METHOD

BACKGROUND OF THE INVENTION

1. Field of the Invention

This invention relates generally to the field of telephonic switching systems and, more particularly, to such systems which automatically alter the communication capabilities of different interior communication ports of a multiport telephonic switch.

2. Description of the Related Art Including Information Disclosed under 37 CFR 1.97-1.99

Telephonic switching systems such as automatic call distributors used in the implementation of telemarketing are well known. Examples of such are shown in patent applications U.S. Ser. No. 07/770,197 of Jones et al. filed Oct. 2, 1991; U.S. Ser. No. 07/416,077 of Jones et al. filed Sep. 29, 1989 and U.S. Ser. No. 07/408,165 of Lenihan et al. filed Sep. 15, 1989. In order to effectuate an efficient telemarketing scheme, it is desired to permit certain types or classes of telephone unit users, such as agents or supervisors, to have certain predetermined capabilities. For example, it may be desirable to prevent an agent from having the capability of receiving outside calls while enabling a supervisor to have the capability of both receiving and making calls outside the system.

In known telephonic switching systems, use of different logical types of interior telephonic units having different physical capabilities are assigned to different classes of users. Only the assigned class of user for a given logical type of unit is able to sign-in on the unit and obtain control of the capabilities associated with the unit. If a class of user, such as a supervisor, attempted to sign in on a logical type of interior telephonic unit, which was assigned to another user class, such as an agent telephonic unit, the supervisor would not be able to gain access to an outside line. In known systems, each class of user is assigned only one type of telephonic unit with limited capabilities. A user assigned to be an agent is assigned a telephonic unit which can perform only assigned agent capabilities. A user assigned to be a supervisor can operate a certain developed supervisory unit in which only a predetermined set of supervisor capabilities can be performed. Likewise, a maintenance user can only gain access through a maintenance device unit which performs only the capabilities assigned for a maintenance user. This is likewise the case for other types of interior telephonic units performing other logical functions in the system.

In known systems, if it is desired to create a new class of user, having its own set of personal capabilities, entirely new hardware for the new instrument unit along with entirely new software and switch interface cards have to be provided. This is because each set of communication capabilities for each different type of physical device is unique. Due to this inflexible and nonreuseable characteristic of current automatic call distributor system, different hardware (e.g. interior telephonic units of different physical capabilities and system interface cards) is needed to provide different functionality at the various ports of a multiport switch in order for the system to perform different specialized functions. These known systems also fail to enable different classes of users to utilize their assigned capabilities on various types of telephonic units regardless of the telephonic switch ports such units are connected.

This known inflexible approach towards implementing various capabilities for different applications is time consuming to develop and maintain. Since these known systems fail to flexibly provide for different functional applications without the need to redesign specialized hardware and software for each different type of user, their costs of implementation and changes are relatively expensive.

SUMMARY OF THE INVENTION

Accordingly, it is the principal object of the present invention to provide a telephonic switching system and network which overcomes the disadvantages of known static systems by providing apparatus and methods of dynamically assigning port capabilities based on a combination of the telephonic units physical capabilities and the personal capabilities of an identified user.

This object is achieved in part by providing a telephonic switching system having a switch controlled by a central processing unit to interconnect an external network of external telephonic units with a plurality of interior telephonic units of various capabilities respectively connectable with a plurality of communication ports of the switch, with an automatic port capability assignment system, comprising means for determining the physical capabilities of the interior telephonic units connected with at least some of the communication ports, means responsive to receipt from an interior telephonic unit interconnected to one of said plurality of ports of a sign-in code identifying a user for ascertaining a predetermined set of authorized personal capabilities permitted for the individual user and means responsive to both the determining means and the ascertaining means for assigning port capabilities to a communication port. In the preferred embodiment, the personal capabilities for which a user is authorized includes the logical device type or the types of telephonic units which the class of user is permitted to use.

The object is also achieved by providing a telephonic switching system having a switch controlled by a central processing unit to interconnect an external network of external telephonic units with a plurality of interior telephonic units respectively connectable with a plurality of communication ports of the switch, with an automatic port capability assignment system comprising means associated with at least one of the interior telephonic units for generating a user sign-in code from the port to which at least one of the interior telephonic units is connected and means responsive to receipt of different user sign-in codes from a port for assigning corresponding different port capabilities to the port.

The object is also achieved by providing in such a telephonic switching system a method of automatically assigning different port capabilities to said plurality of communication ports comprising the steps of determining the physical capabilities of the interior telephonic units connected with at least some of the ports, ascertaining a predetermined set of authorized personal capabilities permitted for the individual user and assigning port capabilities to a communication port in response to both the determining means and the ascertaining means. Preferably, the step of ascertaining includes the step of assigning at least one logical device type to each user and preassigning personal capabilities to at least one of the users.

The object is also achieved by providing in a telephonic switching system a method of automatically assigning different port capabilities comprising the steps of generating a user sign-in code from the port to which said at least one telephonic unit is connected and automatically assigning different port capabilities to the port in response to receipt of different corresponding user sign-in codes from a port.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
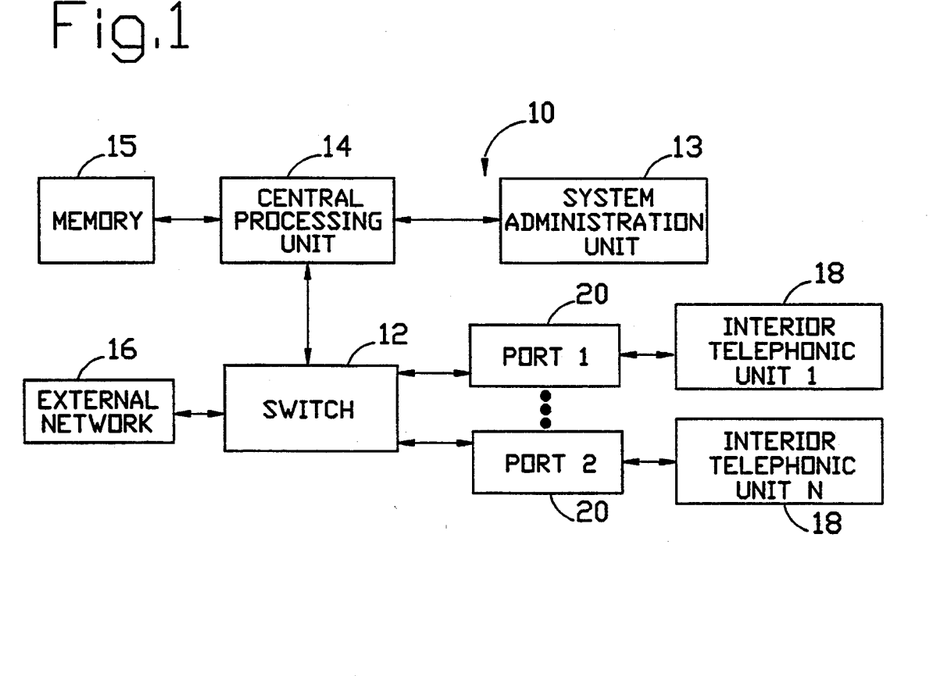
FIG. 1 is a functional block diagram of the preferred embodiment of the telephonic switching system of the present invention.
Figure 5:
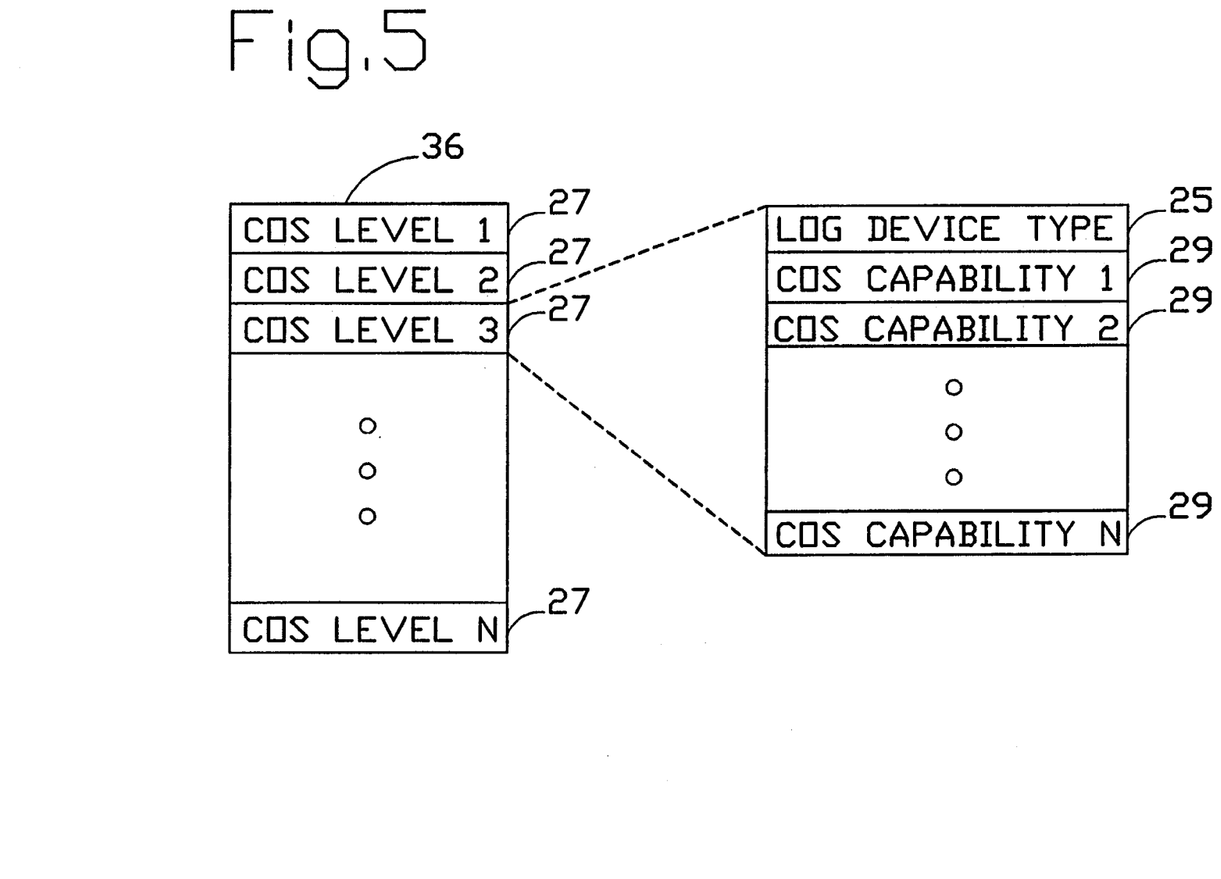
FIG. 5 is a preferred class of service table for the present invention.

Referring to FIG. 1, the multiport switch 12 of the preferred embodiment of the telephonic switching system 10 of the present invention is controlled by a central processing unit 14 in order to interconnect an external network of telephonic units 16 with a plurality of interior telephonic units 18. The interior telephonic units, or physical devices, 18 are each connected with one of a plurality of communication ports 20 of the switch 12. Every communication port 20 is assigned port capabilities based both upon the physical device type of the internal telephonic unit 18 connected to the port and the logical device type 25 as seen in FIG. 5 of the class of service table 36. Physical device capabilities include all capabilities allowed for the physical device 18 and also include the set of allowable logical device types 25 (i.e. the types or classes of users that are allowed on the physical device). In system 10, capability assignments by the automatic port capability assignment system are validated to ensure that the capabilities assigned to a port are allowed for the physical device type 18 assigned to a port 20. The various types of physical devices, or interior telephonic units, 18 which carry voice and data services in the telephonic switching system 10 include but are not limited to: an OEM, or original equipment manufacturer, feature phone, a 2500 set, an integrated services digital network console, a thin-wire agent, a thin-wire supervisor, a thin-wire enhanced agent, a trunk, a receiver, a stop-start announcement, a callback message and a conference port.

Referring to FIG. 1, the type of physical device 18 connected to a port 20 is determined by the central processing unit 14 from inputs from a system administration unit 13. A system administrator causes the central processing unit 14 through keyboard input from a system administration unit 13, preferably a personal computer, to store information in memory 15 to indicate which physical device 18 is assigned and connected to each port 20. The system administrator identifies the physical device type 18 and the associated physical capabilities for each port 20. The details of the switch 12, central processing unit 14 and other elements for the preferred form of the telephonic switching system 10 are described in greater detail in patent applications U.S. Ser. No. 07/770,197 of Jones et al. filed Oct. 2, 1991; U.S. Ser. No. 07/416,077 of Jones et al. filed Sep. 29, 1989 and U.S. Ser. No. 07/408,165 of Lenihan et al. filed Sep. 15, 1989.

Figure 3A:
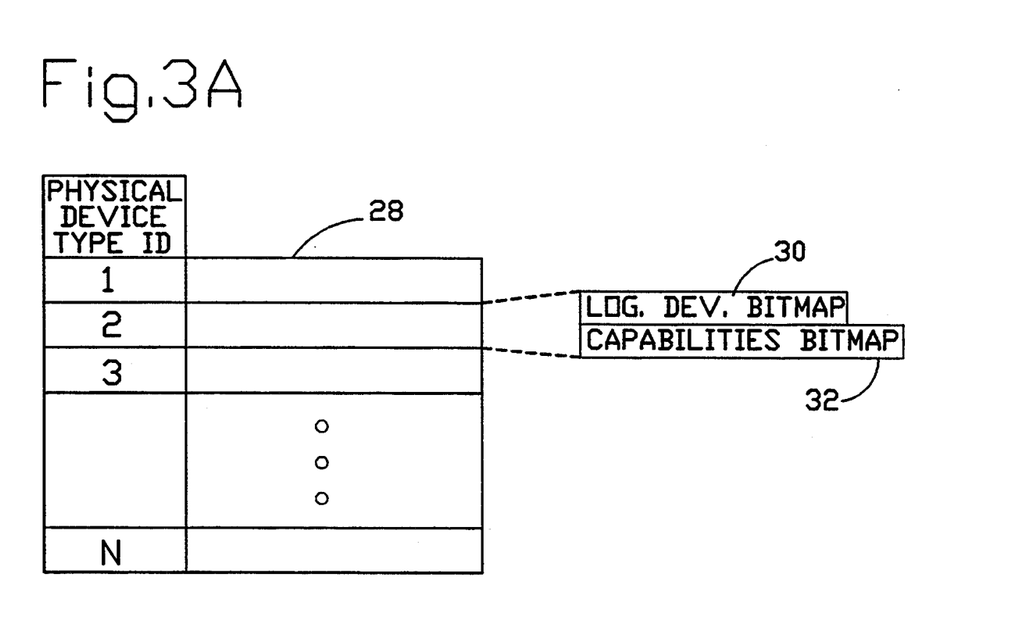
FIG. 3A is a physical device capability table with associated bitmaps for the present invention.
Figure 3B:
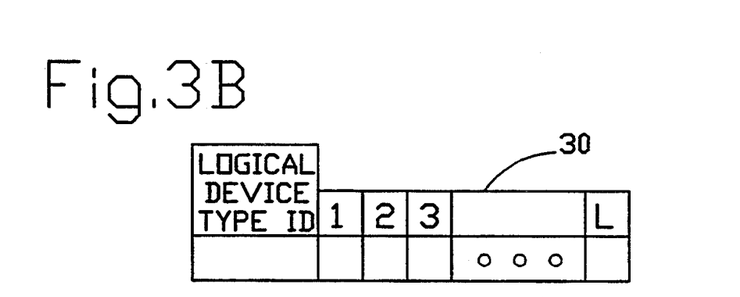
FIG. 3B is a logical device bitmap for the present invention.
Figure 3C:
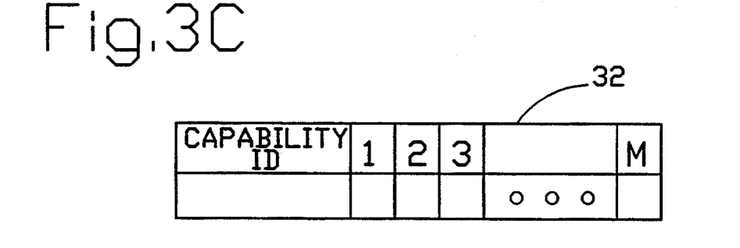
FIG. 3C is a capabilities bitmap for the present invention.
Figure 4A:
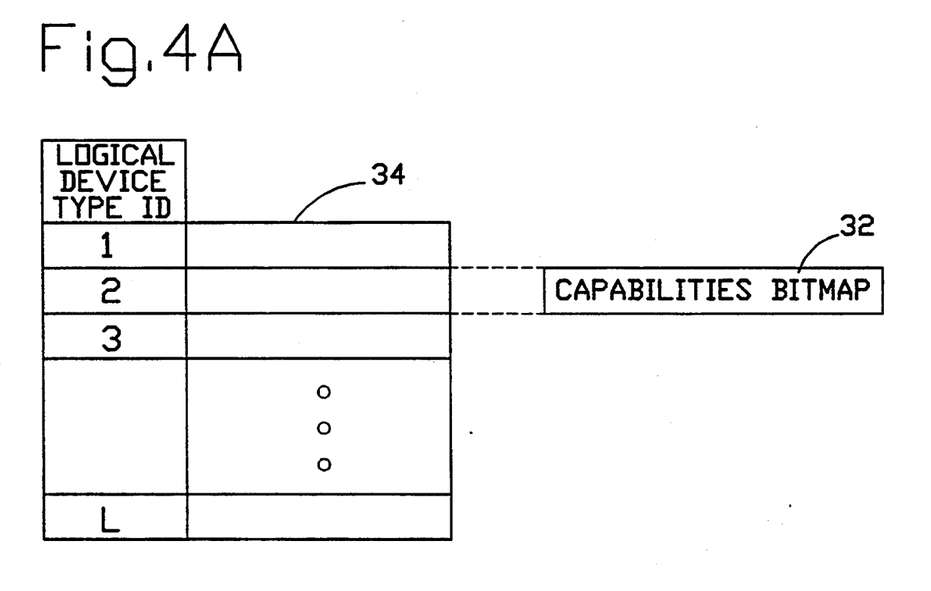
FIG. 4A is a preferred logical device capability table for the present invention.

The physical device capability table 28 of FIG. 3A and the logical device capability table 34 of FIG. 4A are defined to provide the information required to perform a validation of capability assignments. As seen in FIG. 3A, the physical device capability table 28 contains an entry for each physical device type 18. Each entry contains a logical device bitmap 30, FIG. 3B, and a capabilities bitmap 32, FIG. 3C. The capabilities bitmap 32, FIG. 3C, of the physical device 18 has a bit set for each capability that is allowed to exist on the physical device 18. These capabilities include but are not limited to: call connected, call forwarding, call origination, offnet call, onnet call, termination control, maintenance call, emergency, supervisor assist, play announcement, record announcement, sign-in, etc. The physical device capability table 28 determines the physical capabilities of the interior telephonic unit 18 connected with a port 20.

The logical device bitmap 30, FIG. 3B, has a bit set for each logical device that is allowed to exist on the interior telephonic unit or physical device 18. Each user is assigned a logical device type 25, FIG. 5, which corresponds to a particular class of user. Logical device types 25 that are created each have different personal capabilities associated with them (i.e. the capabilities which a particular individual user is allowed to perform). Through the use of the system administration unit 13, FIG. 1, a predetermined set of personal capabilities are assigned for each logical device type 25, FIG. 5. The logical device types include but are not limited to: agents, supervisors, maintenance positions, PBX phones, senders, tones, receivers, announcements, call back messages and trunks.

Figure 4B:
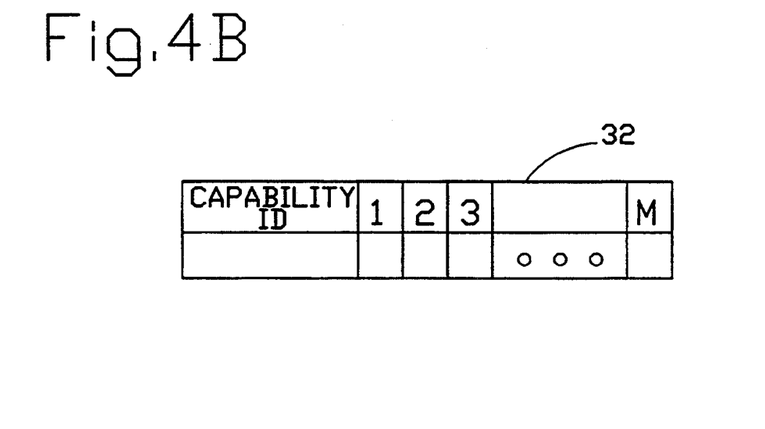
FIG. 4B is a capabilities bitmap of the logical device capabilities table for the present invention.

As seen in FIG. 4A, the logical device capability table 34 contains a capabilities bitmap 32, FIG. 4B, for each logical device type 25, which is also included in each class of service level 27 in the class of service table of FIG. 5. The capabilities bitmap 32 in FIGS. 3C and 4B, has a bit set for each personal capability assigned with its associated logical device.

Figure 2:
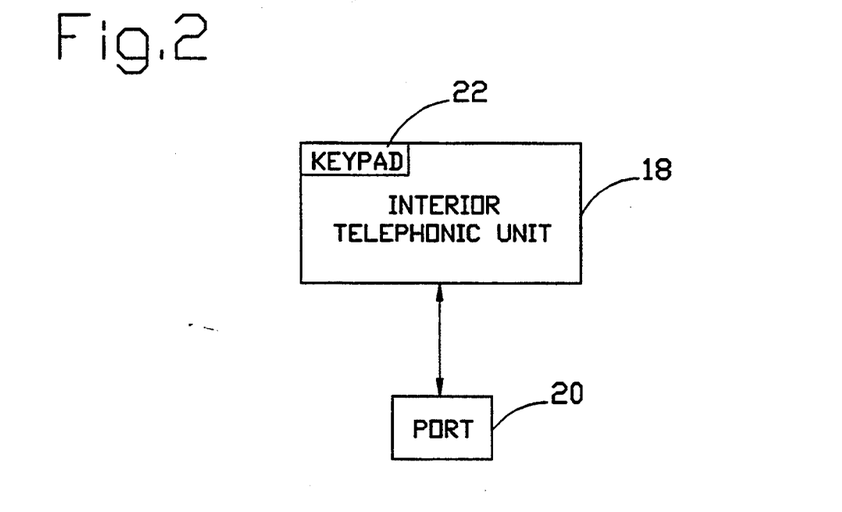
FIG. 2 is a functional block diagram of an interior telephonic unit connected with a port in the telephonic switching system of FIG. 1.
Figure 8:
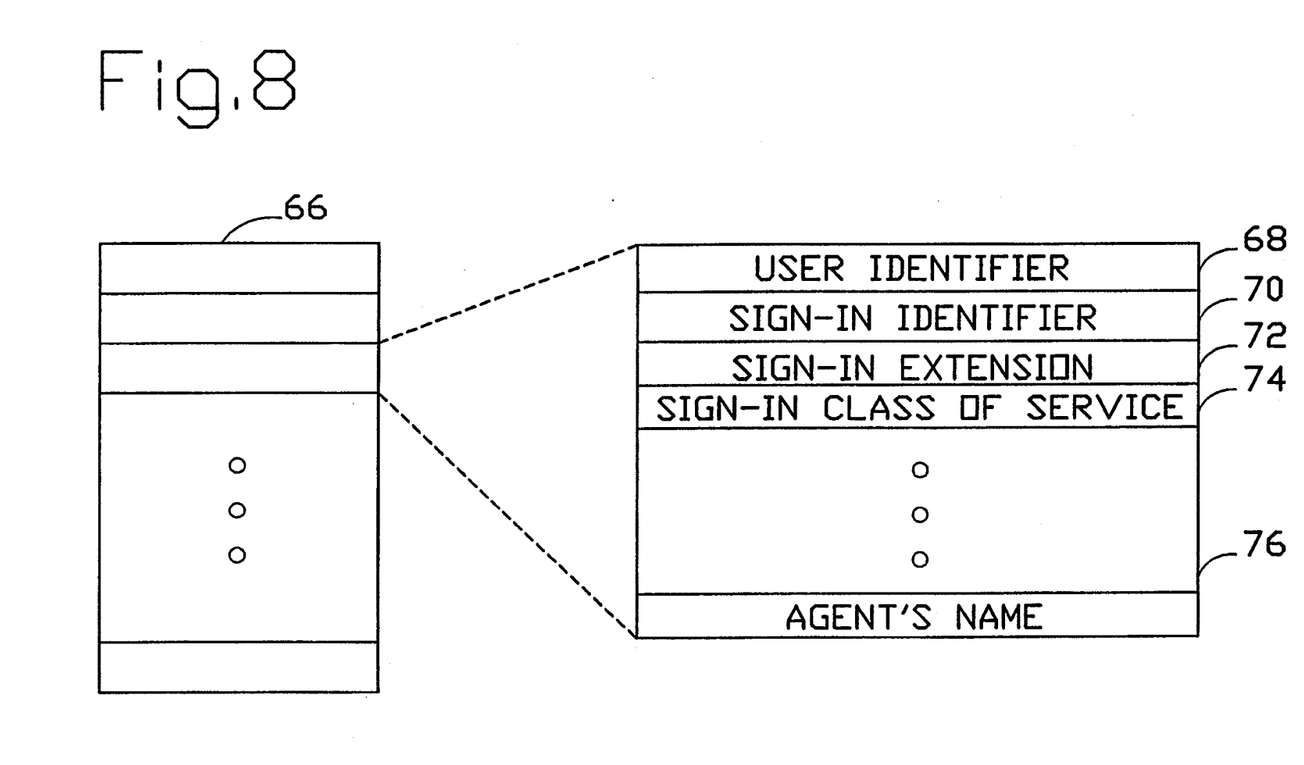
FIG. 8 is the preferred staff table for the present invention.

When a user signs onto the keypad 22, FIG. 2, of the physical device 18, capability mapping system is responsible for reconfiguring the port data area in the main memory 15 of the present invention. The sign-in data is retrieved from a sign-in data table or staff table 66 as seen in FIG. 8. However, before the sign-in is allowed, the logical device type 25, FIG. 5, for the sign-in is validated to ensure that it is allowed for this physical device type 18 which the individual user has signed in on. The individual user must be of the particular class assigned to use the physical device 18 in order for the sign-in to be allowed. When a sign-in occurs, the capabilities and other data from the main memory 15 assigned to that port 20 are replaced by data associated with the user sign-in code. Thus, if a sign-in is allowed, the personal capabilities, which are permitted to be used by the individual user are ascertained by the logical device type capabilities bitmap 30, FIG. 3A. When a permitted user sign-in occurs, the class of service capabilities 29, FIG. 5, are logically conjuncted with the physical device capabilities to eliminate the capabilities not allowed on the physical device 18. The class of service capabilities 29 being those capabilities assigned to an individual user having an associated logical device type 25. In response to the determination of the physical capabilities of the physical device 18 from the central processing unit main memory 15 and the ascertainment of the personal capabilities for the signed in user, the remaining capabilities or port capabilities are assigned to the communication port 20.

If no user has signed in on the interior telephonic unit 18, thereby providing no receipt of a sign-in code from the interior unit, a set of authorized default personal capabilities for the unit is provided which are authorized for use by all individual users. All the default personal capabilities which are assigned to a port 20, FIG. 1, are also included in the physical capabilities determined for the interior telephonic unit 18 connected to the port 20. Since the class of service capabilities 29, FIG. 5, and the physical device capabilities are logically conjuncted together, all the personal capabilities which are indicated both by the sign-in code and included in the physical capabilities are assigned to a port 20 connected to the physical device 18. Each user assigned a sign-in code is authorized to use at least one logical type of interior telephonic unit 10 or physical device 18 designed to be used by certain classes of users.

Figure 9:
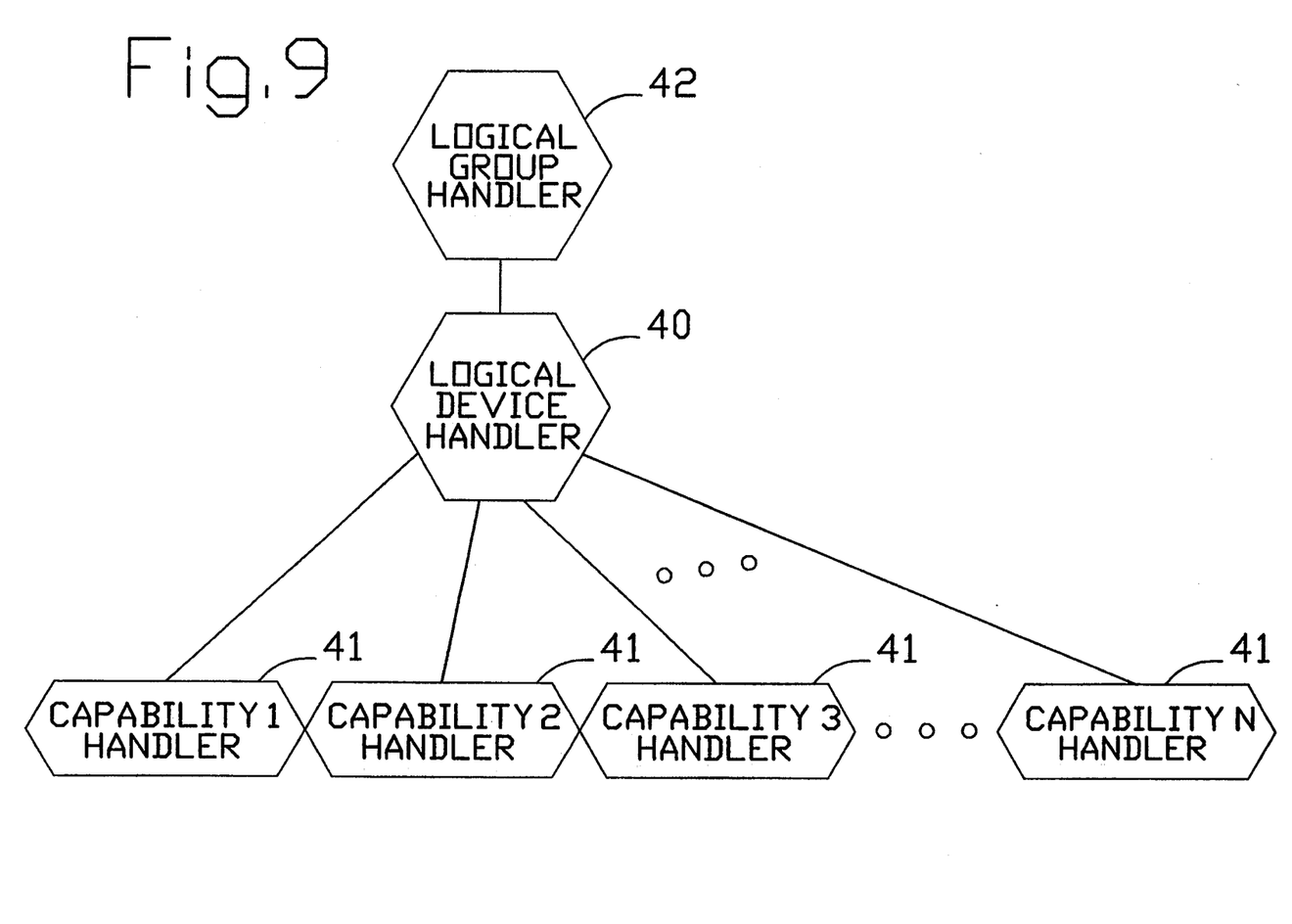
FIG. 9 is a block diagram interrelating logical group handlers, logical device handlers and capability handlers of the present invention.

The assigning of port capabilities to a communication port 20, FIG. 1, includes a capability handler 41, FIG. 9, which establishes a set of rules that are developed to define what sequence of actions take place in executing a feature. The implementation of these rules or the requesting of a series of actions is done through the capability handler 41, FIG. 9, of each capability. The capability handlers 41 provide the features for the port 20 of FIG. 1. A capability handler 41, FIG. 9, is actuated on every port 20, FIG. 1, for those capabilities which have been authorized, or assigned; use of the particular capability. The capability handlers 41, FIG. 9, include a state machine containing a series of instructions or code for the sequence of actions needed to be performed to actually implement the capability assigned to a port 20, FIG. 1.

A logical device handler 40, FIG. 9, is a state machine that controls the activation and interaction of subordinate capability handlers 41 as well as the physical device 18, FIG. 1, itself. The logical device handler 40, FIG. 9, is a set of rules that govern the order in which capabilities can be invoked. Therefore, the logical device handler 40 determines the sequence in which a plurality of capability handlers 41 assigned to a port are actuated. The logical device handler 40, FIG. 9, coordinates calls for ports 20 on a logical basis; thus, the logical device handler has no knowledge of the physical device 18, FIG. 1, being used. In this way, different hardware types or physical devices 18 can be used in various ways to suit different applications. Importantly, unlike known systems, hardware changes are made without extensive software changes. A different logical device handler 40 is provided for each logical device type 25, FIG. 5, selected for a port 20, FIG. 1. These logical device types 25 include but are not limited to an agent, supervisor, maintenance, trunk, PBX phone, sender, receiver and announcements.

Involved in the assigning of capabilities to communication ports 20 are the logical group handlers 42, FIG. 9, which control the actuation of a plurality of logical device handlers 40. Each group is assigned a controlling state machine that is used to handle the usage of the physical devices 18.

The assigning of ports 20 of FIG. 1 include the assigning of at least one type of allowable physical device or interior telephonic unit 18 to perform at least one type of allowable logical function for each capability. For each communication capability assigned to a port, there is at least one interior telephonic unit 18 which has and performs the capability. However, some of the capabilities will be assigned to more than one logical device type. More than one type of physical device or interior telephonic unit 18 is shared by some of the capabilities as well. A logical device handler 40 of FIG. 9 is used to determine the sequence in which the capability handlers 41 assigned to a port 20 are actuated for each logical device type 25, FIG. 5.

Capability assignments are actually specified in the class of service (COS) table 36 of FIG. 5. The permanent data area of a port 20 or a user staff (sign-in) data area, or staff table, 66, FIG. 8, in the main memory 15, FIG. 1, specifies a class of service level 27 which is used as an index into the COS table 36 of FIG. 5. The current class of service level 27, FIG. 5, is stored in the working port table 50 of FIG. 7.

When a class of service level 27, FIG. 5, is defined by a recent change, the capabilities are validated for the given logical device type 25 (which is also contained in the COS table for that level). Recent changes are created by the process of creating software updates which are entered into the system administration unit 13, FIG. 1. The system administration unit 13 accepts the commands to update the database of the main memory 15.

When a port 20, FIG. 1, is defined by a recent change, the port table entry 38 in the permanent port table 44 of FIG. 6 for the port is initialized as follows:

1. The permanent data area in the main memory 15, FIG. 1, of the port 20 is initialized. The permanent data area 15 contains the data that does not change upon sign-in/sign-out or reload from the system disk. This area has all the default data needed to use the port 20, FIG. 1, when no user is signed in. The data varies based on the physical device type 18.

However, all ports 20 will have a common set of information such as: logical port type 25, FIG. 5, partition number, pad/gain value (to be used in the network attenuation plan), receive attenuation, transmit attenuation, class of service value, extension number and sign-in allowed option flag.

2. In order to facilitate the dynamic replacement of data assignments upon user sign-in/sign-out, the permanent port table 44, FIG. 6, is not used during normal run-time call processing. Instead, the working port table 50 of FIG. 7 is populated so that it contains the same type of information as the permanent port table 44 of FIG. 6 but that is replaced on sign-in. In this working port table 50 of FIG. 7 are also located pointers 51 for each capability.

3. For each capability specified in the default COS level's capabilities bitmap 36, writable storage area is allocated. A pointer 51 in the working port table 50 of FIG. 7 (indexed by the capability ID) is set up to point this storage area 52. The storage area 52 of FIG. 7 holds the current state 54, the capability-specific dynamic data 56, a pointer to the capability state machine information 58 and a pointer 60 to the working port table 50 of this port 20. The logical device handler 40, in the working port table 50 for a corresponding port 20, FIG. 1, (which has a capability ID of 1) is initialized in the same way.

4. The initial state of the state machine for each capability is copied into the current state word 54. For the logical device handler 40, a separate table exists and is indexed by the logical port type for that port 20.

5. The capability-specific dynamic data 56 is initialized by the capability state machine. The initial state informs the state machine that the capability specific dynamic data area 56 is not initialized. A state machine must initialize its capability specific dynamic data 56 area when it processes an event while in its "initial state". This initialization will is capability specific in order to allow correct data structures to be populated.

The storage area 52 of FIG. 7 will be allocated on initialization or sign-in from a memory pool. The storage area 52 is used to contain the transient data for the logical device handler 40, FIG. 9, and any capability specific data 56 necessary for the state machine. The state machine contains a pointer 60 pointing back to the port table entry 45 into the working port table 50. This eases the access to the data that is contained on a per port basis.

The capabilities are preferably indexed as follows: 1. circuit quality capability, 2. call forward capability, 3. accept application call capability, 4. call connected capability (1st call), 5. call connected capability (2nd call), 6. call connected capability (3rd call), 7. call originated capability, 8. position call handler capability, 9. offnet calling capability, 10. onnet calling capability, 11. emergency capability, 12. play announcement capability, 13. record announcement capability, 14. vector capability, 15. transaction code capability, 16. supervisor assist capability, 17. sign-in capability.

A standard event header preferably contains the following data items: port ID associated with the sending capability (i.e., state machine), capability ID for the sending capability, mailbox ID of the sending capability (return address), port or group member ID associated with the receiving capability, capability ID for the receiving capability, event ID (which represents the name of the event) and time stamp.

The capability mapping system of the present invention accesses the port table 50 of FIG. 7 to determine how to process the event. The receiving capability port ID and personal capability ID are used as indexes into the table. The port ID is used first to gain entry to the port 20, FIG. 1. The personal capability ID indexes into the array of personal capability pointers 51. If the pointer 51 is NULL, the personal capability is not implemented on this port and the proper maintenance software is invoked.

If a valid capability pointer 51 is present, the state machine table driver software is implemented in order to have the state machine running and to execute the capabilities in accordance with its assigned code.

When a user signs onto the keypad 22, FIG. 2, of the physical device 18, capability mapping is responsible for reconfiguring the data area of the port 20 connected to the physical device 18. The sign-in data is retrieved from the staff table 66 of FIG. 8 in the main memory 15, FIG. 1. Data that is typically included in the staff table 66, FIG. 8, includes the user identifier 68, sign-in identifier 70, sign-in extension 72, sign-in class of service 74, and the agent's name 76. However, before the sign-in is allowed, the logical device type 25, FIG. 5, for the sign-in is validated to ensure that it is allowed for this physical device type 18 on which the individual user has signed in.

If the sign-in is allowed, the following reconfiguring steps are taken:

1. The class of service capabilities 29, FIG. 5, are logically conjuncted with the physical device capabilities to eliminate the capabilities not allowed on the physical device 18 on which the sign-in occurred.

2. For the capabilities that are included in the initial associated capabilities of the port 20 but not in the remaining sign-in capabilities, the dynamic data storage area 56 of FIG. 7 must be deallocated and the pointer 51 to it moved to zero.

3. For those personal capabilities that are included in the remaining class of service capabilities 29, FIG. 5, but not in the initial associated capabilities of the port 20, data storage is allocated.

4. The dynamic data storage area 56 of FIG. 7 is initialized for all remaining class of service capabilities 29, FIG. 5.

There are two exceptions to this method of capability mapping: termination control capability and sign-in capability. The two associated state machines will not be restarted, since they are the state machines that control sign-in and in/out of service transitions.

5. The class of service level is inserted in the working port table 50, FIG. 7.

6. A "sign-in" event is generated to the logical device handler 40, (which may be a different logical device handler than before the sign-in).

Figure 6:
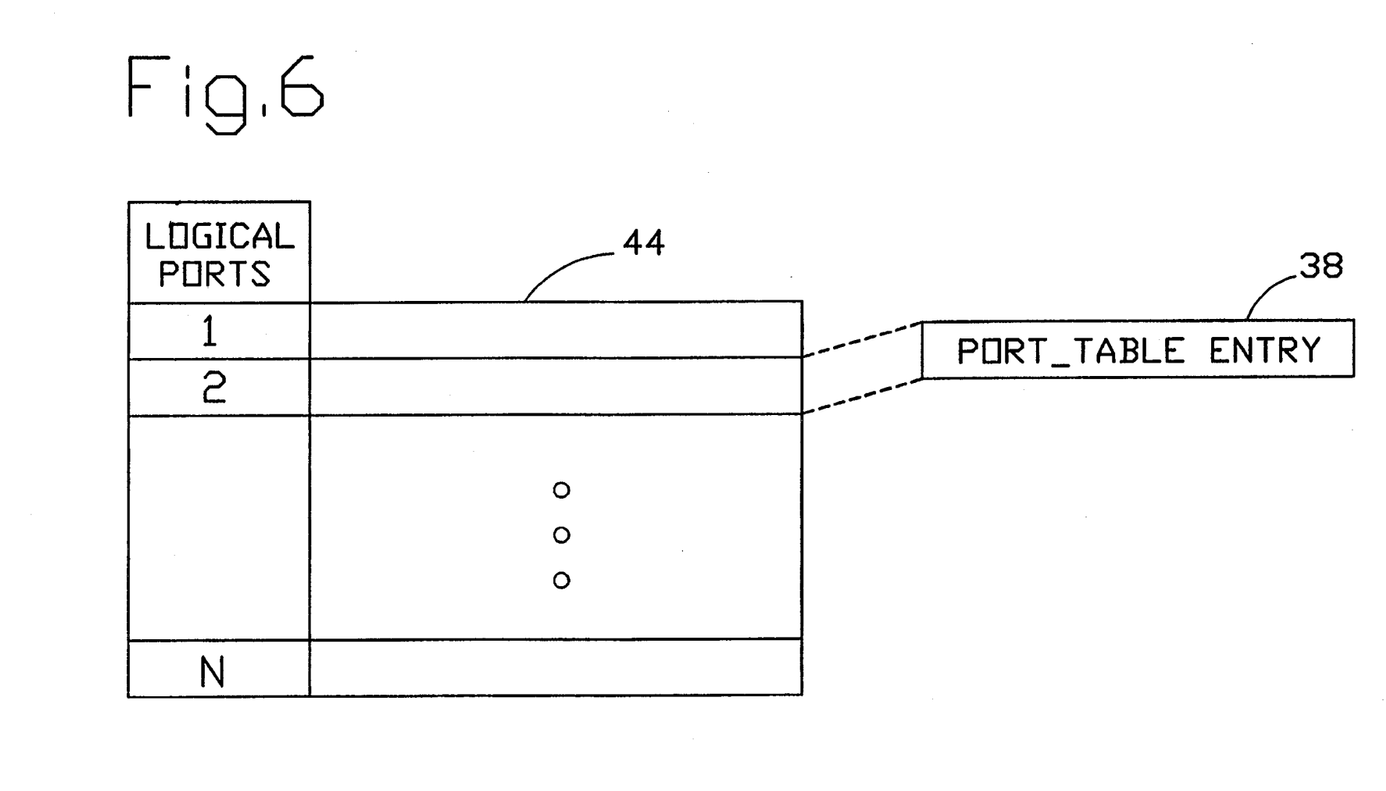
FIG. 6 is a preferred permanent port table for the present invention.
Figure 7:
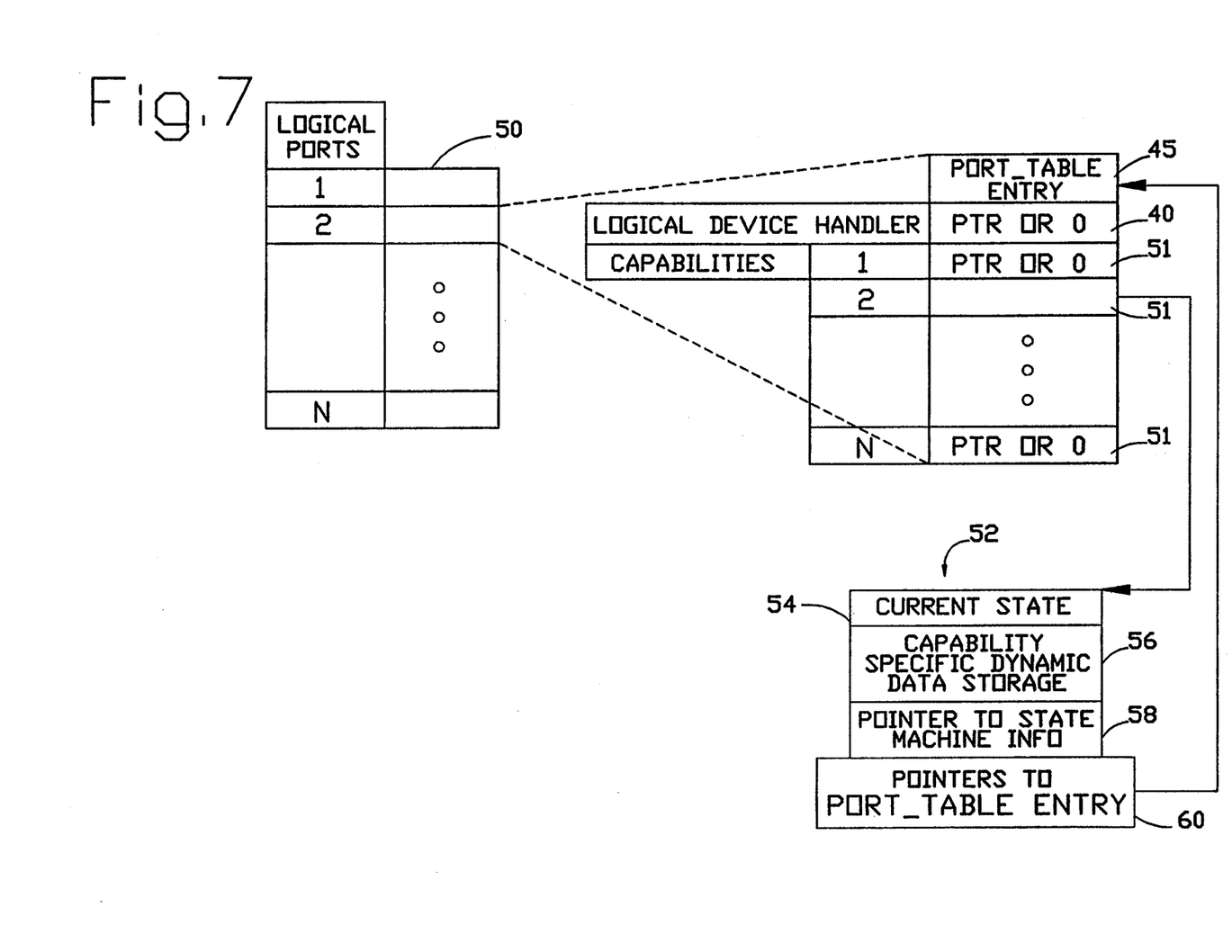
FIG. 7 is a preferred working port table for the present invention.

When a user signs out, capability mapping reconfigures the data area of the port 20, FIG. 1, to return it to the way it was in the permanent port table 44 of FIG. 6. No validation of capabilities is needed for sign-out.

The following reconfiguring steps are taken for sign-out:

1. For the capabilities that currently exist on the port 20 for the sign-in but are not included in the default capabilities, the dynamic data storage 56, FIG. 7, is deallocated, and the pointer 51 is zeroed.

2. For capabilities that are included in the default capabilities but not in the currently existing sign-in capabilities, data storage in the main memory 15, FIG. 1, is allocated.

3. The dynamic data storage area 56 is initialized for all the default capabilities.

4. The class of service value for the sign-in position is replaced by the class of service value from the permanent port table 44 of FIG. 6.

5. The entry for the sign-in extension number is updated to indicate its inaccessibility (if different).

6. A "signed-out" event is generated to the logical device handler 40 (which may be a different logical device handler 40 than before the sign-out).

When recent change modifies the logical device type 25, FIG. 5, or adds/deletes state machine capabilities for some class of service level 27, the actions have to be taken to modify the class of service table 36 of FIG. 5, as follows:

1. The capabilities are validated for the logical device type 25 when the logical device type 25 has been changed or new capabilities have been added.

2. A search is made through each port 20, FIG. 1, in the permanent port table 44, FIG. 6, for the class of service level 27, FIG. 5, assignment. The search only looks at the default class of service level 27, FIG. 5, assignment. For each match found, a validation is performed based on the modification as described below:

When the logical device type 25 has been changed to identify a different user, a check is performed to determine whether the new logical device type 25 or user is allowed for the port 20, FIG. 1, associated with the physical device type 18 on which the user has signed in. If any ports 20 are found where this is violated, the recent change modification is not allowed.

When capabilities are added, a check is performed to determine whether all the new capabilities are allowed on the port 20 of FIG. 1 connected to the physical device type 18. If any ports are found where this is violated, the recent change modification is not allowed.

When capabilities have been deleted, no validation is required.

3. If no violations are found in the validations above, a second search is made through the permanent port table 44 of FIG. 6. For each port 20, FIG. 1, that has a default class of service (COS) level matching the class of service level 27, FIG. 5, that was updated, the pointer to the default-sign-in data is checked to determine if a sign-in is active. If a sign-in is active on the port 20, FIG. 1, the permanent port table 44 will be updated automatically with the changes when sign-out occurs. If a sign-in is not active, a "COS update" event is sent to the logical device handler 40, FIG. 9. As soon as the port 20 is idle, the logical device handler 40, FIG. 9, will call a function to update the permanent port table 44.

If capabilities have been added, the working port table 50, FIG. 7, is updated to contain the new capabilities. For each new capability, this entails the allocation and initialization of the dynamic data storage area 56 of FIG. 7 and setting up the capability pointer 51 to this area.

If capabilities have been deleted, each of the capability pointers 51 is nulled and the dynamic data storage area 56 deallocated.

In FIG. 2, the keypad 22 on the interior telephonic unit 18 is used by the operator or individual user of the interior telephonic unit to generate a sign-in code when the individual user desires to gain access to the telephonic unit 18. The individual user is assigned a sign-in code which corresponds to a particular class type of user, for example, an agent or supervisor class. A system administrator specifies through the system administration unit 13 to the CPU memory 15 of FIG. 1 a predetermined set of personal capabilities for the individual users in each class or logical device type 25, FIG. 5. In response to the individual user signing in on the keypad 22, FIG. 2, of the interior telephonic unit 18, different port capabilities are assigned to the port 20 which correspond to the individual user who has entered his assigned sign-in code on the telephonic unit 18.

The interior telephonic unit 18 which the user has signed in on and gained access to is treated as a personally assigned interior telephonic unit 18 to the individual user. Since all the capabilities are stored in the main memory 15, FIG. 1, any user can sign-in on a particular physical device 18 and perform all his assigned personal capabilities allowable for the physical device 18. The port 20 corresponding to the accessed interior telephonic unit 18 is assigned all the capabilities which the individual user is allowed to perform on the interior telephonic unit. This provides different individual users the flexibility to access and perform their assigned communication capabilities on many different physical device types 18.

A system administrator through the use of the system administration unit 13 of FIG. 1, which is typically a personal computer, commands the memory 15 of the central processing unit 14 to specify which interior telephonic unit 18 is assigned and connected to its corresponding port 20. The physical capabilities for each physical device 18 connected to a port 20 is also specified in the central processing unit 14 main memory 15. In response to the generation of the sign-in code of the individual user and the determination of the physical capabilities of the physical device 18, the port capabilities are assigned to the corresponding port 20. This is done by the class of service capabilities 29, FIG. 5, assigned to the individual user being conjuncted with the physical device capabilities to determine the remaining port capabilities. A default capability is permitted for use by all users at a port 20, FIG. 1, regardless of their user sign-in code.

The assigning of port capabilities to a port 20 includes a logical device handler 40 of FIG. 9 which establishes the set of rules that govern the order or sequence in which capabilities can be invoked. A set of rules are developed to define what sequence of actions take place in executing a feature in order to view how the feature works within the telephonic switching system 10, FIG. 1. These rules are implemented through capability handlers 41, FIG. 9. A state machine will be activated on every port 20 that is allowed to use a particular capability or feature. The interaction between capability handlers 41, FIG. 9 is controlled by the logical device handler 40. The logical device handler 40 of FIG. 9 is a state machine that controls the interaction and determines the sequence in which capability handlers 41 are actuated. A different logical device handler 40 is activated for each logical device type 25, FIG. 5, selected for the port 20, FIG. 1. At least one of the following logical device types 25 which are selected for the port 20, FIG. 1, include: agent, supervisor, maintenance, trunk, PBX phone, sender, receiver and announcements.

Thus a method of automatically assigning different port capabilities to communication ports 20 in a telephonic switching system 10 of FIG. 1 having a switch 12 controlled by a central processing unit 14 that interconnects an external network 16 of outside or external communication units with interior telephonic units 18 is provided. The step of determining the physical capabilities of the interior telephonic unit 18 connected to a port 20 includes the steps of a system administrator storing code accessible to the central processing unit 14 through the use of a system administration unit 13, FIG. 1, to specify each physical device 18 and the corresponding physical capabilities of each physical device connected to its respective port 20 and then making a determination by accessing the stored code when needed to make the determination. The step of assigning a logical device type 25, FIG. 5, or class type to an individual user is performed and is also specified in the main memory 15 of the central processing unit 14. The method also includes the step of assigning the predetermined set of personal capabilities for each individual user. This is preferably based in part on the logical device type 25 to which the individual user is assigned and on other personal capabilities determined for the particular individual user. The step of ascertaining the personal capabilities permitted for the individual user is performed in response to the user signing in on an interior telephonic unit 18. The step of conjuncting the ascertained personal capabilities for the individual user with the determined physical capabilities of the physical device 18 connected to the port 20 is then completed to assign the remaining port capabilities for the corresponding communication port 20.

Preferably, an individual user operates the keypad 22, FIG. 2, associated with the interior telephonic unit 18 interconnected with a port 20 to perform the step of generating a sign-in code of the individual user. The issuing of different port capabilities includes the step of assigning all the personal capabilities which are ascertained from the sign-in code to the port 20. These personal capabilities are also included in the physical capabilities determined for the interior telephonic unit 18 connected to the port 20.

A default personal capability specifies a set of capabilities that exist for a port 20 when no user is signed in. Thus, when no user is signed in on an interior telephonic unit 18, there being no receipt of a sign-in code, the step of establishing default personal capabilities is accomplished by the central processing unit 14. The default personal capabilities are permitted for use by all individual users.

The assigning of port capabilities includes the step of assigning all the default personal capabilities to the port 20 which are also included in the determined physical capabilities of the interior telephonic unit 18 connected to the port.

Automatically assigning different port capabilities to a single port 20 connected to a interior telephonic unit 18 includes the step of a user generating a new or different user sign-in code on the keypad 22, FIG. 2, of the interior telephonic unit 18 which is connected to the port 20. In response to the receipt of a different sign-in code from a different user, the step of assigning different port capabilities to this same port 20 connected to the physical device 18 is initiated. The different user is then able to perform all his assigned personal capabilities which are permitted for use on the telephonic unit 18 on which he has signed in.

The step of determining the physical capabilities for the interior telephonic unit 18 connected to a port 20 is included for assigning the port capabilities. The step of assigning port capabilities for the telephonic switching system is based on both the physical capabilities determined for the telephonic unit connected to the port 20 and on the sign-in code of the user. The step of establishing default personal capabilities which are permitted for use by all users at a port 20 is performed regardless of the user sign-in code. A logical device handler 40, FIG. 9, is included as one of the default capabilities, which performs the step of determining the sequence in which a plurality of capability handlers 41, FIG. 9, assigned to a port 20, FIG. 1, are activated.

While a detailed description of the preferred embodiment of the invention has been given, it should be appreciated that many variations can be made thereto without departing from the scope of the invention as set forth in the appended claims.

We claim:

1. In a telephonic switching system having a switch controlled by a central processing unit to interconnect an external network of external telephonic units with a plurality of interior telephonic units of various capabilities respectively connectable with a plurality of communication ports of the switch, the improvement being an automatic port capability assignment system, comprising:

means for determining the physical capabilities of an interior telephonic unit connected with at least some of the communication ports;

means responsive to receipt from the interior telephonic unit interconnected to one of said plurality of ports of a sign-in code identifying a user for ascertaining or predetermined set of authorized personal capabilities permitted for the individual user; and means responsive to both the determining means and the ascertaining means for assigning port capabilities to a communication port.

2. The telephonic switching system of claim 1 in which the ascertaining means includes means for assigning to each user sign-in code authorization for use of at least one logical type of interior telephonic unit.

3. The telephonic switching system of claim 1 in which said ascertaining means includes means responsive to interconnection of an interior telephonic unit for establishing a default predetermined set of authorized personal capabilities permitted for use by all users when there is no receipt of a sign-in code.

4. The telephonic switching system of claim 3 in which said assigning means includes means for assigning all the default personal capabilities to a port which are also included in the physical capabilities determined for the interior telephonic unit connected to the port.

5. The telephonic switching system of claim 1 in which said assigning means includes means for assigning all the personal capabilities to a port which are ascertained from the sign-in code and included in the physical capabilities determined for the interior telephonic unit connected to the port.

6. The telephonic switching system of claim 1 in which said assigning means includes a capability handler for establishment of a series of actions for implementation of each capability that has been assigned to a port, and means for actuating on every port the capability handlers of those capabilities which have been assigned to the port.

7. The telephonic switching system of claim 6 in which each of said capability handlers includes a state machine containing a code for the sequence of actions needed to be performed to implement the capability thereof.

8. The telephonic switching system of claim 6 in which said assigning means includes a logical device handler for determining the sequence in which a plurality of capability handlers assigned to a port can be activated.

9. The telephonic switching system of claim 8 in which a different logic device handler is provided for each logical device type selected for a port including at least one of the logical device types of agent, supervisor, maintenance, trunk, PBX phone, sender, receiver and announcements.

10. The telephonic switching system of claim 6 in which said assigning means includes a logical group handler for controlling the actuation of a plurality of logical device handlers.

11. The telephonic switching system of claim 1 in which for each capability assigned to the ports there is at least one interior telephonic unit determined to be a device type having said capability.

12. The telephonic switching system of claim 11 in which for some of the capabilities more than one logical device type is assigned by said assigning means.

13. The telephonic switching system of claim 11 in which there are capabilities shared by more than one type of interior telephonic unit.

14. The telephonic switching system of claim 11 in which said assigning means includes a logical device handler for determining the sequence in which a plurality of capability handlers assigned to a port can be actuated for each of said logical device types.

15. In a telephonic switching system having a switch controlled by a central processing unit to interconnect an external network of external telephonic units with a plurality of interior telephonic units respectively connectable with a plurality of communication ports of the switch, the improvement being an automatic port capability assignment system, comprising:
means associated with at least one of the interior telephonic units for generating a user sign-in code from the port to which at least one of the interior telephonic units is connected; and
means responsive to receipt of different user sign-in codes from a port for enabling regular communication at the port and for assigning correspondingly different port capabilities to the port only when enabled.

16. The telephonic switching system of claim 15 including means responsive to at least some of the interior telephonic units connected to a port for determining the physical capabilities of the interior telephonic units.

17. The telephonic switching system of claim 16 in which said port capability assigning means includes means responsive to the determining means and the user sign-in code to assign port capabilities.

18. The telephonic switching system of claim 15 in which said sign-in code responsive means includes means for establishing default capabilities permitted for use by all users at a port regardless of their user sign-in code.

19. The telephonic switching system of claim 15 in which said assigning means includes a logical device handler for determining the sequence in which a plurality of capability handlers assigned to a port can be activated.

20. The telephonic switching system of claim 19 in which said assigning means includes a different logic device handler for each logical device type selected for a port including at least one of the logical device types of agent, supervisor, maintenance, trunk, PBX phone, sender, receiver and announcements.

21. In a telephonic switching system having a switch controlled by a central processing unit to interconnect an external network of external telephonic units with a plurality of interior telephonic units of different types having different associated capabilities respectively connectable with a plurality of communication ports of the switch, a method of automatically assigning different port capabilities to said plurality of communication ports, comprising the steps of:
determining the type of interior telephonic unit connected with one of the communication ports;
ascertaining a preselected set of authorized personal capabilities for an individual user at the interior telephonic unit; and
assigning port capabilities to a communication port connected to the interior telephonic unit in response to both the determining means and the ascertaining means.

22. The method of claim 21 including the step of generating from an interior telephonic unit interconnected to one of said plurality of ports a sign-in code of an individual user at said one of said plurality of ports.

23. The method of claim 22 including the step of establishing default personal capabilities permitted for use by all individuals when there is no receipt of a sign-in code.

24. The method of claim 21 in which said personal capabilities permitted for the user includes use of at least one interior telephonic unit of the plurality of different type units.

25. The method of claim 21 including the step of assigning all the default personal capabilities to a port which are also included in the physical capabilities determined for the interior telephonic unit connected to the port.

26. The method of claim 21 in which said step of assigning includes the step of assigning all the personal capabilities to a port which are ascertained from the sign-in code and included in the physical capabilities determined for the telephonic unit connected to the port.

27. The method of claim 21 in which said step of ascertaining includes the step of preassigning personal capabilities to at least one of the users.

28. The method of claim 21 in which said step of ascertaining includes the step of assigning the personal capability associated with at least one device type of telephonic unit.

29. In a telephonic switching system having a switch controlled by a central processing unit to interconnect an external network of external telephonic units with a plurality of interior telephonic units respectively connectable with a plurality of communication ports of the switch, a method of automatically assigning different port capabilities comprising the steps of:
generating a user sign-in code from a port for enabling communication at the port to which said at least one interior telephonic unit is connected; and
automatically assigning different port capabilities to the port to which said at least one interior telephonic unit is connected only, when said communication is enabled in response to receipt of different corresponding user sign-in codes from the port.

30. The method of claim 29 including the step of determining the physical capabilities of the interior telephonic units connected to a corresponding port.

31. The method of claim 29 in which said step of assigning includes the step of assigning port capabilities based on both the physical capabilities determined for the telephonic unit connected to the port and the user sign-in code.

32. The method of claim 30 including the step of establishing selected default capabilities permitted for use by all users at a port regardless of their user sign-in code.

33. The method of claim 30 including the step of determining the sequence in which a plurality of capability handlers assigned to a port can be activated.

* * * * *